United States Patent
An et al.

(10) Patent No.: US 9,994,139 B2
(45) Date of Patent: Jun. 12, 2018

(54) LEG REST APPARATUS FOR VEHICLE

(71) Applicant: HYUNDAI DYMOS INCORPORATED, Seosan-si, Chungcheongnam-do (KR)

(72) Inventors: Sung Chol An, Hwaseong-si (KR); Jin Ho Seo, Yongin-si (KR); Jun Kyu Kim, Hwaseong-si (KR); Chan Uk Park, Gyeongju-si (KR); Myeong Sub Kim, Seongnam-si (KR); Yun Ho Kim, Osan-si (KR); Dong Hwan Kim, Hwaseong-si (KR)

(73) Assignee: HYUNDAI DYMOS INCORPORATED, Seonsan-si, Chungcheongnam-do (KR)

( * ) Notice: Subject to any disclaimer, the term of this patent is extended or adjusted under 35 U.S.C. 154(b) by 0 days. days.

(21) Appl. No.: 15/327,179

(22) PCT Filed: Jul. 9, 2015

(86) PCT No.: PCT/KR2015/007109
§ 371 (c)(1),
(2) Date: Jan. 18, 2017

(87) PCT Pub. No.: WO2016/013787
PCT Pub. Date: Jan. 28, 2016

(65) Prior Publication Data
US 2017/0174105 A1    Jun. 22, 2017

(30) Foreign Application Priority Data

Jul. 25, 2014    (KR) .................. 10-2014-0094559

(51) Int. Cl.
*A47C 7/50* (2006.01)
*A47C 20/00* (2006.01)
(Continued)

(52) U.S. Cl.
CPC .......... *B60N 2/995* (2018.02); *B60N 2/0232* (2013.01); *B60N 2/4495* (2013.01)

(58) Field of Classification Search
CPC ...... B60N 2/4495; B60N 2/0232; B60N 2/44; B60N 2/0224; B60N 2/02; B60N 2/00
(Continued)

(56) References Cited

U.S. PATENT DOCUMENTS 5,992,931 A * 11/1999 LaPointe .............. A47C 1/0345
297/330
8,708,417 B2 * 4/2014 Mejuhas ................. B60N 2/62
297/423.23
(Continued)

FOREIGN PATENT DOCUMENTS

JP    2002-238695 A    8/2002
JP    2013-255750 A    12/2013
(Continued)

OTHER PUBLICATIONS

Translation of International Search Report, PCT/KR2015/007109, filed Jul. 9, 2015, search dated Oct. 6, 2015, 2pp.

*Primary Examiner* — Mark R Wendell
(74) *Attorney, Agent, or Firm* — Brinks Gilson & Lione

(57) ABSTRACT

The present disclosure provides a leg rest device for a vehicle. The leg rest device includes: a leg rest coupled to the front side of a seat cushion of a vehicle; a driving unit to fold and unfold the leg rest upward and downward; and a tilting unit that has a side coupled to the leg rest and the other side coupled to the seat cushion. In particular, the tilting unit tilts the leg rest forward at a predetermined angle when the leg rest is unfolded.

5 Claims, 4 Drawing Sheets

(51) Int. Cl.
*B60N 2/44* (2006.01)
*B60N 2/02* (2006.01)

(58) Field of Classification Search
USPC .................................... 297/423.26, 423.19
See application file for complete search history.

(56) References Cited

U.S. PATENT DOCUMENTS

| | | | | |
|---|---|---|---|---|
| 2007/0289063 | A1* | 12/2007 | Martin | A61G 5/10 |
| | | | | 5/618 |
| 2010/0244534 | A1* | 9/2010 | Driessen | B60N 2/4495 |
| | | | | 297/423.35 |
| 2011/0215200 | A1* | 9/2011 | Mejuhas | B60N 2/62 |
| | | | | 244/118.6 |

FOREIGN PATENT DOCUMENTS

| | | |
|---|---|---|
| KR | 10-1307281 B1 | 9/2013 |
| KR | 10-2014-0055057 A | 5/2014 |

* cited by examiner

[FIG.1]
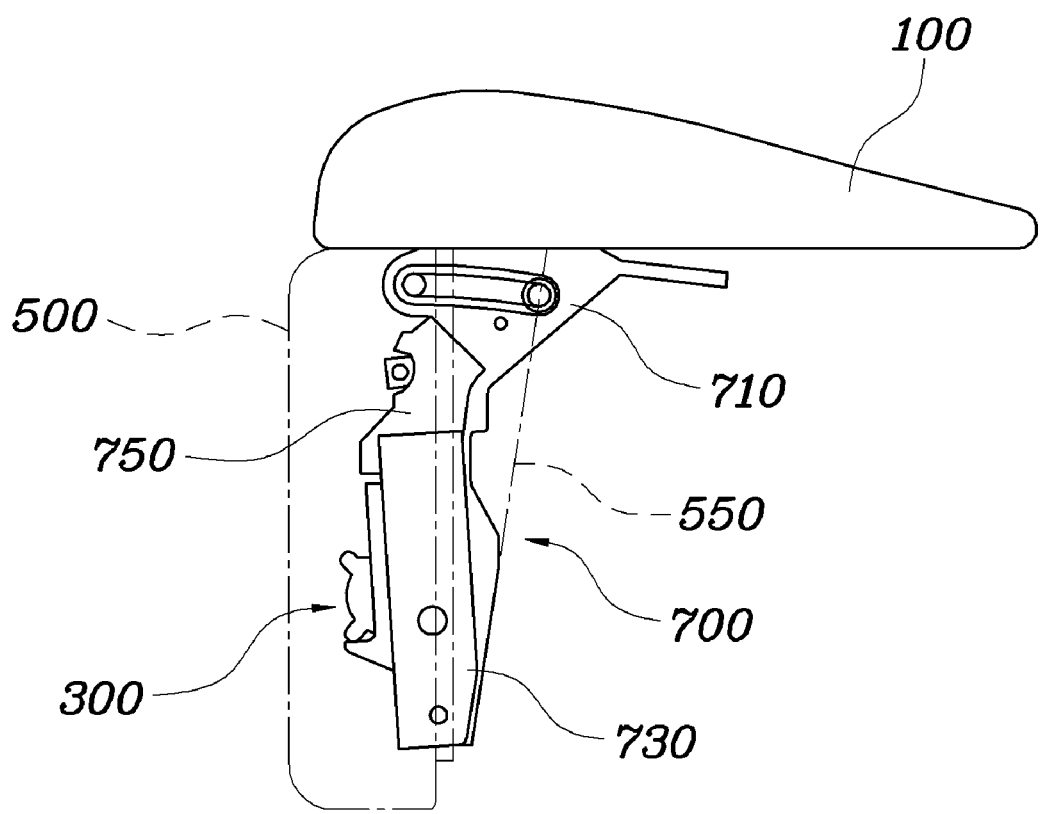

[FIG.2]
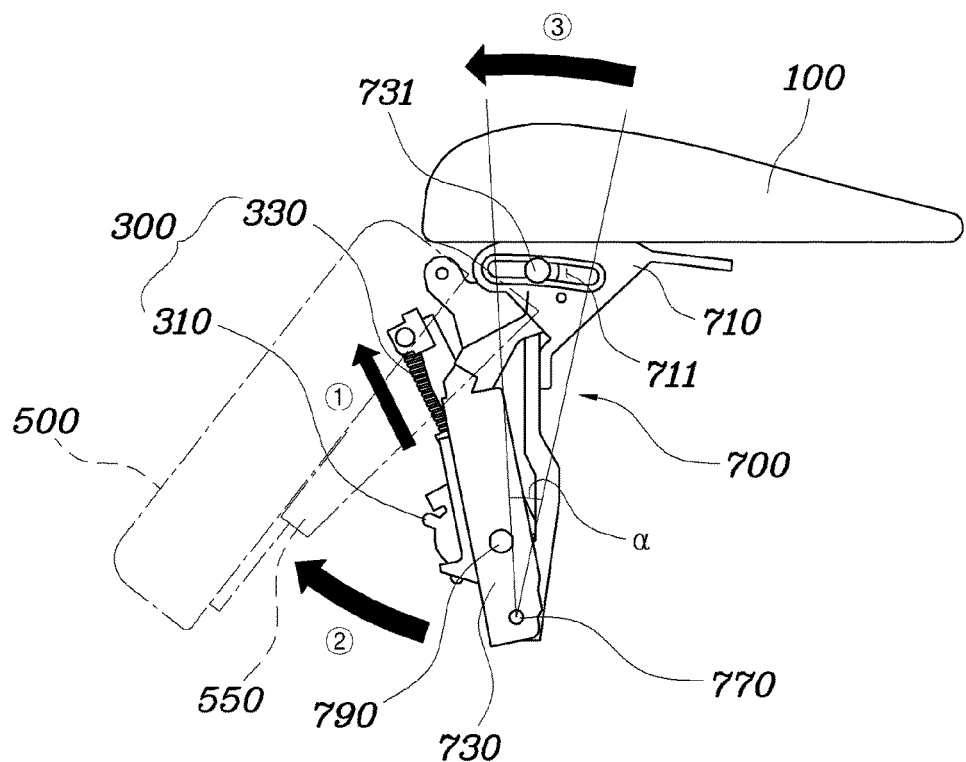

[FIG.3]
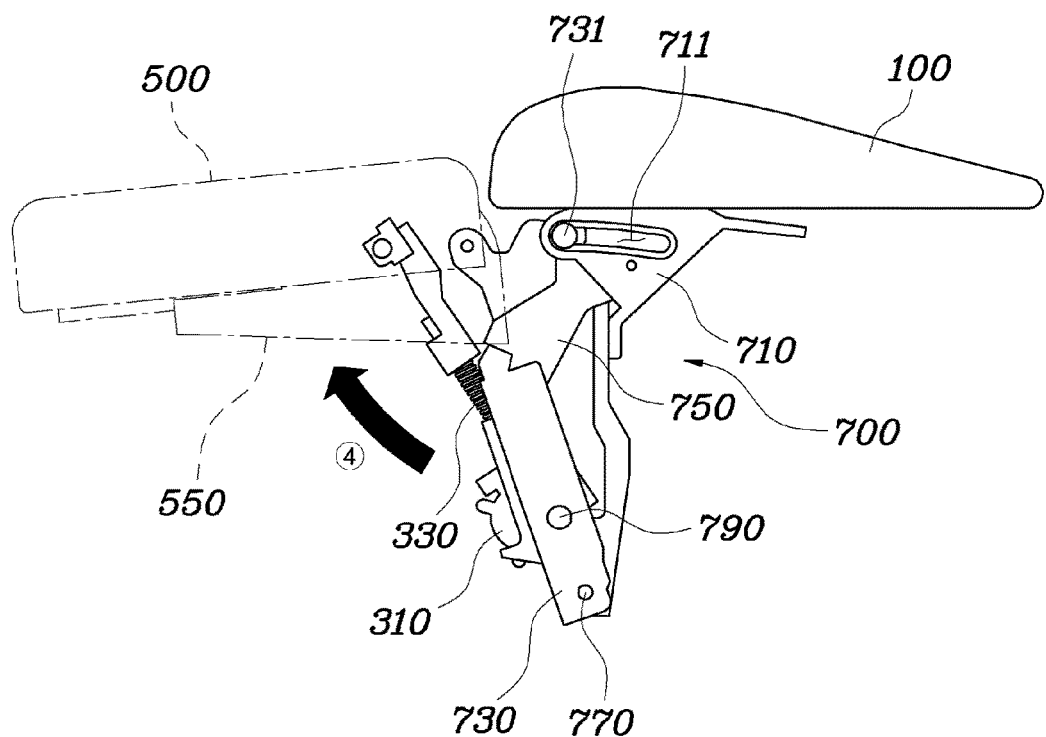

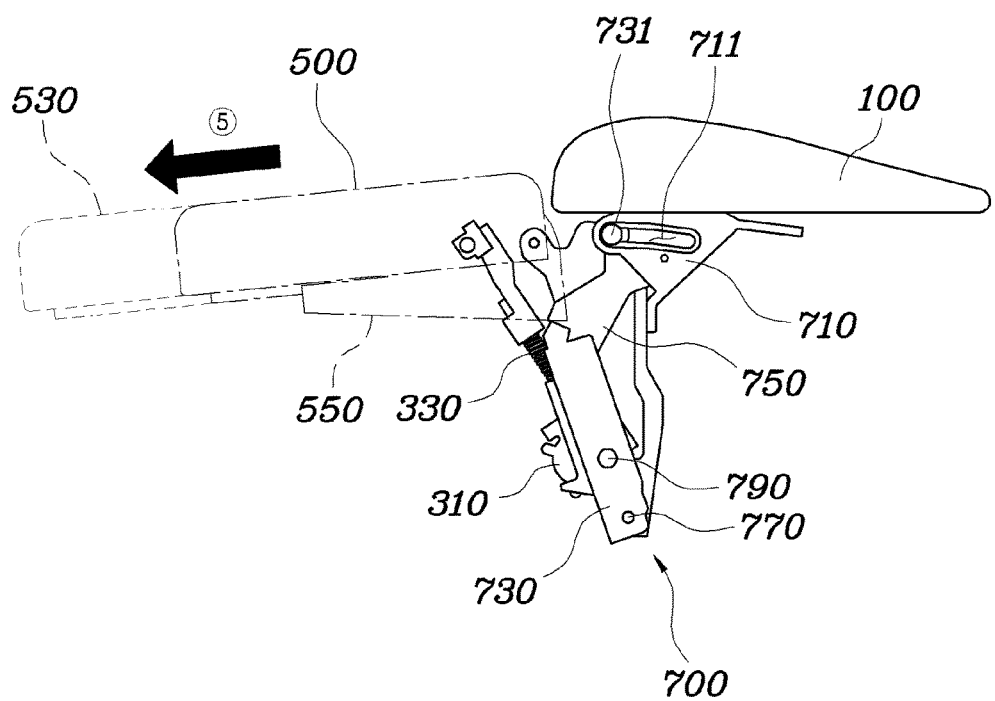
[FIG.4]

LEG REST APPARATUS FOR VEHICLE

CROSS-REFERENCE TO RELATED APPLICATIONS

This application is a nationalization of International Application No. PCT/KR2015/007109, filed on Jul. 9, 2015, which claims priority to and the benefit of Korean Patent Application No. 10-2014-0094559, filed on Jul. 25, 2014, the entirety of each of which are hereby incorporated by reference.

FIELD

The present disclosure relates to a leg rest device for a vehicle and, more particularly, to a leg rest device for a vehicle that inhibits or prevents interference with a seat cushion when a leg rest is operated.

BACKGROUND

The statements in this section merely provide background information related to the present disclosure and may not constitute prior art.

In general, seats in a vehicle are equipped with various convenience devices so that users can more conveniently maintain a seating state. Among the convenience devices, a leg rest is installed on a seat cushion such that the lower end of the seat cushion can rotate forward so that a user seating in the seat cushion can keep his/her legs in a convenient position.

However, according to leg rest devices for a vehicle in the related art, in a height-up operation of the leg rest devices, the rear end of the leg rest and the front end of a seat cushion interfere with each other, so poor operation and interference noise are generated and wrinkles or coming-off of the seat cover is generated.

The description provided above as a related art of the present disclosure is just for helping understanding the background of the present disclosure and should not be construed as being included in the related art known by those skilled in the art.

SUMMARY

The present disclosure provides a leg rest device for a vehicle that can inhibit or prevent poor operation and interference noise by inhibiting or preventing interference between the rear end of a leg rest and the front end of a seat cushion in a height-up operation of the leg rest device and that can remove wrinkles or coming-off of the seat cover.

In one form of the present disclosure, a leg rest device for a vehicle may include: a leg rest that is coupled to the front side of a seat cushion of a vehicle; a driving unit configured to fold or unfold the leg rest upward and downward; and a tilting unit that has a side coupled to the leg rest and the other side coupled to the seat cushion and tilts the leg rest forward at a predetermined angle when the leg rest is unfolded.

The driving unit may include a motor and a screw and is coupled to the lower side of the tilting unit, and when the motor is operated, the screw presses the leg rest upward, so that the leg rest is unfolded upward.

The tilting unit may have a guide member through which a guide hole is formed in the front-rear direction, and a sliding member on which a guide protrusion is formed, and when the leg rest is unfolded, the guide protrusion slides forward along the guide hole, so that the leg rest is tilted forward.

The lower sides of the guide member and the sliding member may be hinged by a first hinge shaft and the sliding member is tilted around the first hinge shaft forward and backward.

The titling unit may further comprise a support member of which one end is coupled to the guide member and the other end is coupled to the sliding member and which supports the leg rest under the leg rest.

The sliding member and the support member may be hinged at the lower sides by a second hinge shaft.

The leg rest may further have an operating portion, an expanding portion sliding forward and backward by the operation of the operating portion, and a holding portion supporting the lower side of the leg rest.

According to the leg rest device for a vehicle configured as described above, interference between the seat cushion and the leg rest is avoided when the leg rest is unfolded, so it is possible to remove poor operation and interference noise due to interference.

Further, in a vehicle where an integrated seat cover is mounted, it is possible to prevent wrinkles or coming-off of the front end of the seat cover due to interference between the seat cushion and the leg rest, so the commercial value is increased with improvement of the quality of the external appearance of the seat. Further, satisfaction of a user and the brand image are improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1 to 4 are views sequentially showing a process from folding to unfolding of a leg rest device for a vehicle in one form of the present disclosure.

The drawings described herein are for illustration purposes only and are not intended to limit the scope of the present disclosure in any way.

DETAILED DESCRIPTION

A leg rest device for a vehicle in one form of the present disclosure is described hereafter with reference to the accompanying drawings.

FIGS. 1 to 4 are views sequentially showing a process from folding to unfolding of a leg rest device for a vehicle in one form of the present disclosure.

A leg rest device for a vehicle includes: a leg rest 500 that is coupled to the front side of a seat cushion 100 of a vehicle and folded or unfolded upward by operation of a driving unit 300; and a tilting unit 700 that has a side coupled to the leg rest 500 and the other side coupled to the seat cushion 100 and tilts the leg rest 500 forward at a predetermined angle when the leg rest 500 is unfolded.

Further, as illustrated in FIGS. 2-4, the tilting unit 700 includes: a guide member 710 through which a guide hole 711 is formed and extends in the front and rear directions, and a sliding member 730 on which a guide protrusion 731 is formed. Further, the tilting unit 700 further includes a support member 750 of which one end is coupled to the guide member 710 and the other end is coupled to the sliding member 730 and the support member 750 supports the leg rest 500 from under the leg rest 500. The lower sides of the guide member 710 and the sliding member 730 are hinged by a first hinge shaft 770, so the sliding member 730 is tilted around the first hinge shaft 710 in the front and rear directions. Further, the lower side of the support member 750 is hinged to the sliding member 730 by a second hinge shaft 790.

As shown in FIG. 1, the leg rest 500 is maintained in a folded state under the seat cushion 100 in a normal state. However, when the driving unit 300 is operated to unfold it by necessity of a user and it is unfolded upward, it finally enters an unfolding-completed state shown in FIG. 4 through the steps of FIGS. 2 and 3.

Components and operations are described in more detail. The driving unit 300 includes a motor 310 and a screw 330 and is coupled to the lower side of the tilting unit 700. In this form, although the driving unit 300 is coupled to the lower side of the sliding member 730 of the tilting unit 700 in the drawings, the positional relationship and the shape can be changed freely in accordance with the environment or the design. Accordingly, when the motor 310 of the driving unit 300 is operated, the screw 310 presses the leg rest 500 upward from under it, so the leg rest 500 is unfolded upward.

The tilting unit 700 includes the guide member 710, the sliding member 730, and the support member 750. The guide member 710 is coupled to the lower side of the seat cushion 100, and a guide hole 711 is formed in the upper side of the guide member 710. The guide hole 711 extends in the front and rear directions, forming an arc shape. Further, the lower side of the guide member 710 is hinged to the lower side of the sliding member 730 by the first hinge shaft 770, and when the leg rest 500 is unfolded, the sliding member 710 is tilted forward around the first hinge shaft 770. The first hinge shaft 770 may be hinged such that the sliding member 730 is rotated by a predetermined distance around the guide member 710, a slit hole shorter than the guide hole 711 of the guide member 710 may be formed for further distance tilting, and a slit protrusion may be formed at the sliding member 730 such that the slit protrusion slides in the slit hole.

The upper side of the sliding member 730 may be coupled to the leg rest 500 by a hinge. The lower side of the sliding member 730 is coupled to the lower side of the guide member 710 by around the first hinge shaft 770 therebetween. The guide protrusion 731 protrudes to a side of the seat cushion 100 at a position corresponding to the guide hole 711 at the upper side of the sliding member 730 and is guided by the guide hole 711 such that the guide protrusion 731 slides in the front and rear directions along the guide hole 711. The guide protrusion 731 is positioned at a rear side of the guide hole 731 of the guide member 710 when the leg rest 500 is folded. However, when the leg rest 500 is unfolded, the sliding member 730 is tilted forward and the guide protrusion 731 slides forward along the guide hole 711. Accordingly, the unfolded leg rest 500 is spaced apart, with a predetermined distance, from the most-front side of the seat cushion 100, so interference is avoided between the seat cushion 100 and the leg rest 500 even when the leg rest 500 is fully unfolded, and accordingly, coming-off and wrinkles at the front end of the seat cushion do not occur.

An end of the support member 750 is coupled to the guide member 710 and the other end is coupled to the sliding member 730, thereby supporting the leg rest 500 from under the leg rest 500. An end of the support member 750 is fixed to the guide member 710 and the other end is hinged to the lower side of the sliding member 730 by the second hinge shaft 790. The second hinge shaft 790 is positioned at an upper side than the first hinge shaft 770. These coupling devices can be sufficiently replaced with a coupling protrusion and a coupling groove and can be freely changed in accordance with the design or the environment. Accordingly, the support member 750 provide a slight rotational gap so that the sliding member 730 can rotate by a distance shorter than the tilting distance around the second hinge shaft 790 when the sliding member 730 is tilted forward, whereby the support member 750 can be tilted forward while sufficiently supporting the leg rest 500.

The leg rest 500 further has an expanding portion 530 sliding forward/backward so that the leg rest 500 can be expanded, an operating portion (not shown) allowing the expanding portion 530 to slide, and a holding portion 550 supporting the leg rest 500 from under the leg rest 500 when the leg rest 500 is unfolded. The sliding operation of the leg rest 500 is a well-known technology in the related art, for example, Patent Publication No. KR10-2014-0055057 A, so the detailed description is not provided.

The operation of the leg rest device for a vehicle of the present disclosure is described in detail through FIGS. 1 to 4. First, FIG. 1 is a view showing a case when the leg rest 500 is folded, in which it can be seen that the leg rest 500 is maintained in a folded state without a specific operation by a user. If a user operates the leg rest 500, the leg rest 500 is unfolded upward by the driving unit 300. At this time, the leg rest 500 sequentially performs height-up operation and sliding operation in which the expanding portion 530 slides out after the height-up operation is finished. Accordingly, it can be seen that the height-up operation is performed from FIGS. 2 and 3 and that sliding operation is performed from FIG. 4.

Under unfolding operation by a user, the leg rest 500 performs height-up operation first, and as shown in FIG. 2, the motor 310 of the driving unit 300 is operated and the screw 330 presses the leg rest 500 in the direction of an arrow ①. Then, the leg rest 500 moves up along the arrow ② and is tilted forward by an angle α in the direction of an arrow ③, thereby avoiding interference between the seat cushion 100 and the leg rest 500.

Thereafter, the leg rest 500 is fully moved up in the direction of an arrow ④ in FIG. 3, thereby finishing the height-up operation. When the height-up operation of the leg rest 500 is finished, as shown in FIG. 4, the expanding portion 530 is slid in the direction of an arrow ⑤ by the operating portion, so sliding is finished and unfolding operation of the leg rest 500 is finished. Obviously, the height-up operation and the sliding operation can be selectively made using a switch, depending on the taste of a user.

According to the leg rest device for a vehicle described above, interference between the seat cushion and the leg rest is avoided when the leg rest is unfolded, so it is possible to remove poor operation and interference noise due to interference. Further, in a vehicle where an integrated seat cover is mounted, it is possible to prevent wrinkles or coming-off of the front end of the seat cover due to interference between the seat cushion and the leg rest, so the commercial value is increased with improvement of the quality of the external appearance of the seat. Further, satisfaction of a user and the brand image are improved.

Although the present disclosure was described with reference to specific forms shown in the drawings, it is apparent to those skilled in the art that the present disclosure may be changed and modified in various ways without departing from the scope of the present disclosure.

The invention claimed is:

1. A leg rest device for a vehicle, comprising:
   a leg rest coupled to a front side of a seat cushion of a vehicle;
   a driving unit configured to fold or unfold the leg rest upward and downward; and
   a tilting unit that has a side coupled to the leg rest and another side coupled to the seat cushion, the tilting unit configured to tilt the leg rest forward when the leg rest is unfolded,
   wherein the tilting unit includes a guide member through which a guide hole is formed in a front-rear direction, and a sliding member having an upper portion formed with a guide protrusion and a lower portion pivotally attached to a lower portion of the guide member by a first hinge shaft,
   wherein the guide protrusion is configured to slide along the guide hole when the leg rest is unfolded or folded, and
   wherein the sliding member is tilted around the first hinge shaft forward and backward.

2. The device of claim 1, wherein the driving unit includes a motor and a screw and is coupled to a lower side of the tilting unit, and when the motor is operated, the screw presses the leg rest upward so that the leg rest is unfolded upward.

3. The device of claim 1, wherein the titling unit further comprises a support member of which one end is coupled to the guide member and another end is coupled to the sliding member, the support member configured to support the leg rest.

4. The device of claim 3, wherein the sliding member and the support member are hinged at the lower sides by a second hinge shaft.

5. The device of claim 1, wherein the leg rest further has an operating portion, an expanding portion sliding forward and backward by operation of the operating portion, and a holding portion supporting the lower side of the leg rest.

* * * * *